US007343240B2

(12) United States Patent
Sugiyama et al.

(10) Patent No.: US 7,343,240 B2
(45) Date of Patent: Mar. 11, 2008

(54) FUEL INJECTION CONTROLLER

(75) Inventors: Kouichi Sugiyama, Chiryu (JP); Koji Ishizuka, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 11/606,957

(22) Filed: Dec. 1, 2006

(65) Prior Publication Data

US 2007/0144492 A1 Jun. 28, 2007

(30) Foreign Application Priority Data

Dec. 26, 2005 (JP) ............................ 2005-372161

(51) Int. Cl.
*F02M 51/00* (2006.01)
*G06F 17/00* (2006.01)

(52) U.S. Cl. ...................... 701/104; 123/480; 123/674; 73/119 A

(58) Field of Classification Search ................ 701/103, 701/104, 105, 110, 115; 123/446, 478, 480, 123/490, 674; 73/119 A
See application file for complete search history.

(56) References Cited

U.S. PATENT DOCUMENTS

| | | | | |
|---|---|---|---|---|
| 5,320,077 | A * | 6/1994 | Kamiya et al. | 123/339.11 |
| 5,694,912 | A * | 12/1997 | Gotou et al. | 123/674 |
| 6,755,176 | B2 | 6/2004 | Takeuchi et al. | 123/299 |
| 7,167,790 | B2 * | 1/2007 | Kikutani | 701/103 |
| 7,219,005 | B2 * | 5/2007 | Mazet | 701/104 |

FOREIGN PATENT DOCUMENTS

| | | |
|---|---|---|
| DE | 19527218 B4 | 3/2004 |

* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

In a case that actual values of a fuel injection quantity and fuel pressure are not in consistent with a representative point, an interpolation process is conducted by used of a learn value of a plurality of representative points. During the interpolation process, a computer determines whether the number of learning exceeds a predetermined number N. When the number of learning is less that the number N, the learn value at the representative point is replaced by the learning value at a representative point of the actual values.

5 Claims, 7 Drawing Sheets

FUEL INJECTION CONTROLLER

CROSS-REFERENCE TO RELATED APPLICATION

This application is based on Japanese Patent Application No. 2005-372161 filed on Dec. 26, 2005, the disclosure of which is incorporated herein by reference.

FIELD OF THE INVENTION

The present invention relates to a fuel injection controller, which learns and stores a deviation amount relative to a reference amount of operational characteristic of an actuator that is used for fuel injection control. The deviation amount is calculated with respect to a plurality of regions which are divided with parameters used for calculation of fuel injection control.

BACKGROUND OF THE INVENTION

In a multi-cylinder engine, each fuel injection valve has dispersion in fuel injection characteristic thereof, which may cause an unstable rotation of a crankshaft of the engine. A deviation amount between the fuel injection characteristic of each fuel injection valve and a reference fuel injection characteristic is learned in order to uniform the rotation speed of the crankshaft which is obtained by each fuel injection in each cylinder. DE-19527218B4 shows such a control system.

The deviation amount is varied according to the fuel pressure supplied to the fuel injection valve. JP-2003-254139A shows that the deviation amount is learned with respect to a plurality of regions which are defined by the fuel pressure. The deviation amount is learned according to the fuel pressure, so that the fuel injection valve is appropriately operated to compensate the deviation amount. When the fuel injection valve is operated with the deviation amount, an interpolating process is usually used. In the interpolating process, a representative point is defined with respect to each region. In a case that the representative point is not consistent with the actual fuel pressure, a deviation amount corresponding to the actual fuel pressure is calculated by interpolating process by use of a deviation amount at a plurality of representative points adjacent to the actual fuel pressure. Thereby, the fuel injection valve is appropriately operated in such a manner as to compensate the actual deviation.

However, in a case that a representative point exists in which the deviation amount has not been learned, the interpolating process cannot be conducted appropriately. Furthermore, even if the learning is conducted, the appropriate deviation amount cannot be learned by conducting the interpolating process only once. Such a problem may arise to a control system in which a deviation amount of the operational characteristic of the actuator, which is used for fuel injection control, relative to the reference amount is learned with respect to each representative point defined by the parameters used for fuel injection control calculation.

SUMMARY OF THE INVENTION

The present invention has been made in view of the foregoing problems and an object of the present invention is to provide a fuel injection controller which learns a deviation amount of an operational characteristic of an actuator relative to a reference amount, and can compensate the actual deviation appropriately even when the learning process of the deviation amount at the representative point has not been completed.

According to the present invention, a fuel injection controller includes a learning means for learning and storing a deviation amount relative to a reference of an operational characteristic of an actuator, an operating means for operating the actuator in such a manner as to compensate the deviation amount which is obtained by an interpolating process in a case that actual value of parameters are consistent with no representative point, a determining means for determining whether the deviation amount converges at the representative point which is used for the interpolating process and is in a region where the actual value of parameters does not exist, and a substituting means for substituting the deviation amount at the representative point in a region in which the actual value of parameters exists for the deviation amount which has not converged.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DETAILED DESCRIPTION OF EXAMPLE EMBODIMENT

First Embodiment

A first embodiment of the present invention will be hereinafter explained with reference to accompanying drawings. A fuel injection controller is structured as to be applied to a diesel engine.

Figure 1:
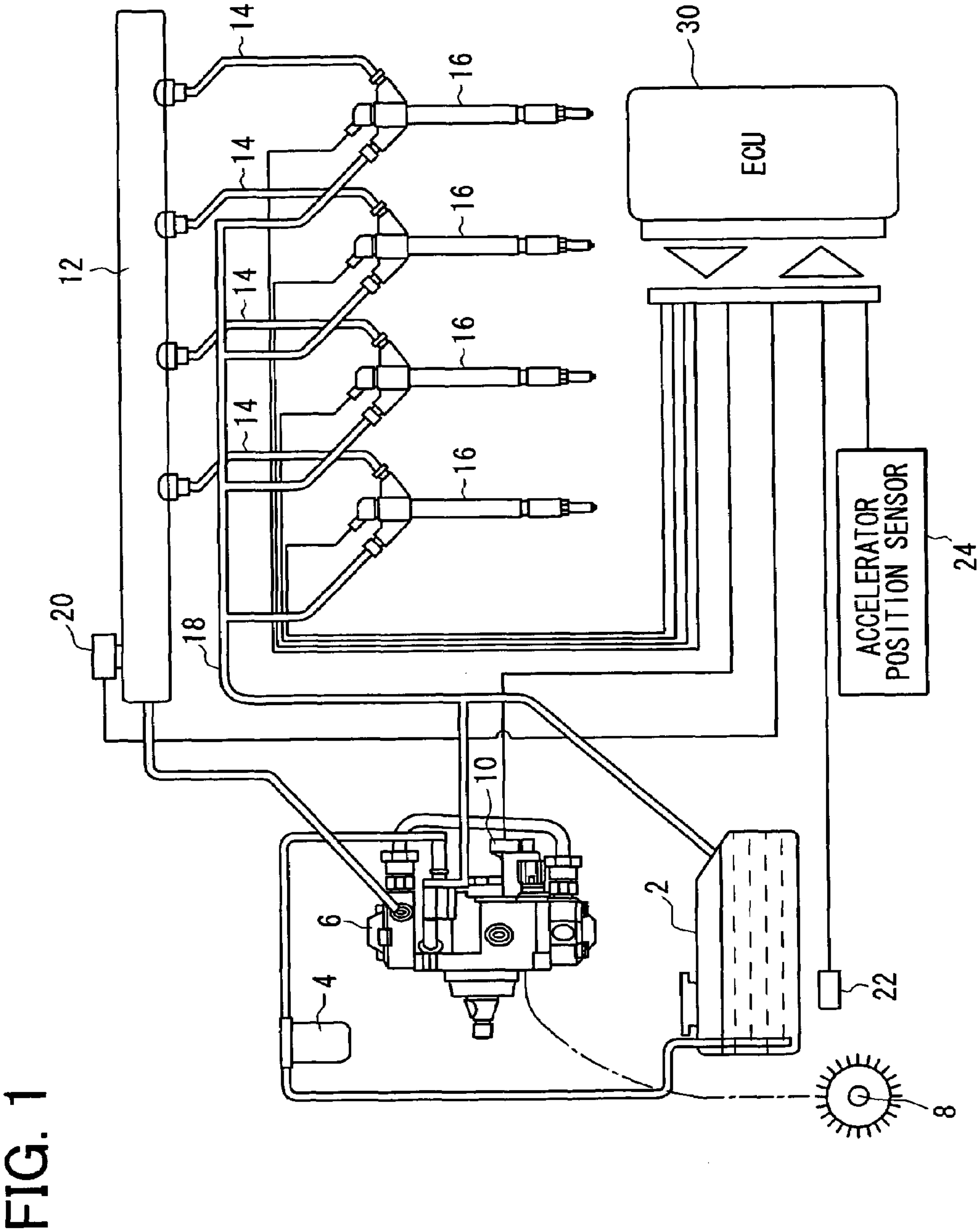
FIG. 1 is a schematic structural diagram showing an engine system in a first embodiment of the present invention.

FIG. 1 is a schematic view showing an engine control system. A fuel pump 6 that is driven by a crankshaft 8 pumps up fuel in a fuel tank 2 through a fuel filter 4. The fuel pump 6 is provided with a suction control valve 10 which adjusts fuel quantity that is discharged from the fuel pump 6. The fuel pump 6 is provided with two plungers (not shown) that reciprocate in order to suck and discharge the fuel.

The fuel discharged from the fuel pump 6 is supplied to a common rail 12. The common rail 12 accumulates the fuel in high pressure therein. The fuel is distributed to each fuel injector 16 through high-pressure fuel passages 14. The fuel injectors 16 communicate to the fuel tank 2 through low-pressure fuel passages 18.

The engine control system is provided with a fuel pressure sensor 20 detecting fuel pressure in the common rail 12, a crank angle sensor 22 detecting rotation angle of the crankshaft 8, and various sensors detecting the driving condition of the diesel engine. Furthermore, the engine control system is provided with an accelerator position sensor 24 detecting a stepped amount of the accelerator pedal.

An electronic control unit (ECU) 30 is comprised of a microcomputer, which conducts a fuel injection control in order to obtain desired rotation speed of the crankshaft 8.

Figure 2A:
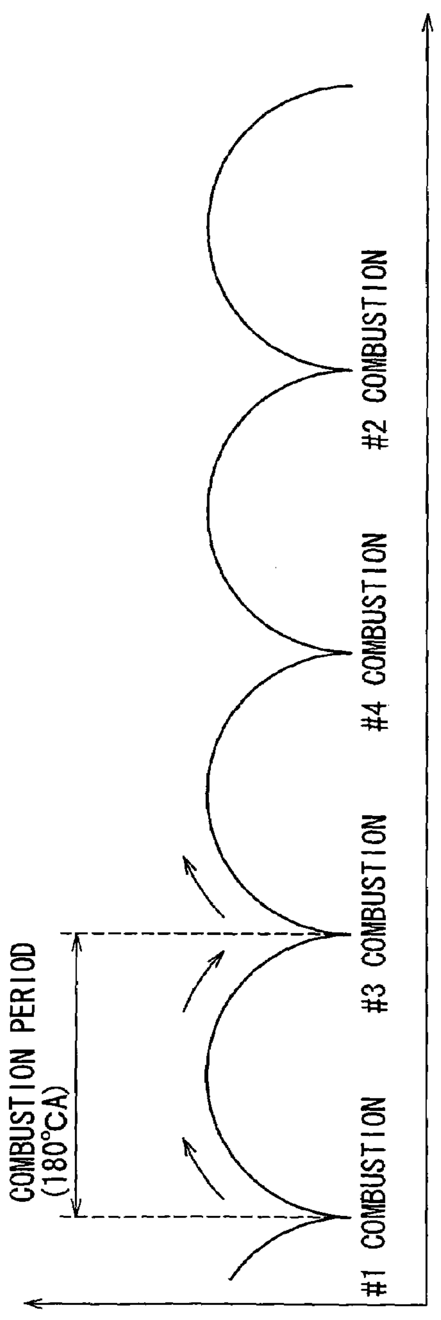
FIGS. 2A and 2B are time charts showing a transition of a rotation speed of each cylinder.

Analyzing the rotation speed of the crankshaft 8 in a very small time period, an increase and a decrease of the rotation speed repeat in synchronization with each stroke of the combustion cycle. FIG. 2A is a graph showing a crankshaft rotation speed behavior in detail. In a case of a four-cylinder engine, the combustion is conducted in a first cylinder (#1), a third cylinder (#3), a fourth cylinder (#4), and a second cylinder (#2) in this order. The fuel injection is performed every 180° CA. An increase and a decrease in the rotation speed are repeated in each stroke. The combustion in the cylinder increases the rotation speed, and then a load applied to the crankshaft decreases the rotation speed. It can be understood that a workload can be estimated with respect to each cylinder based on the rotation speed behavior.

Figure 2B:
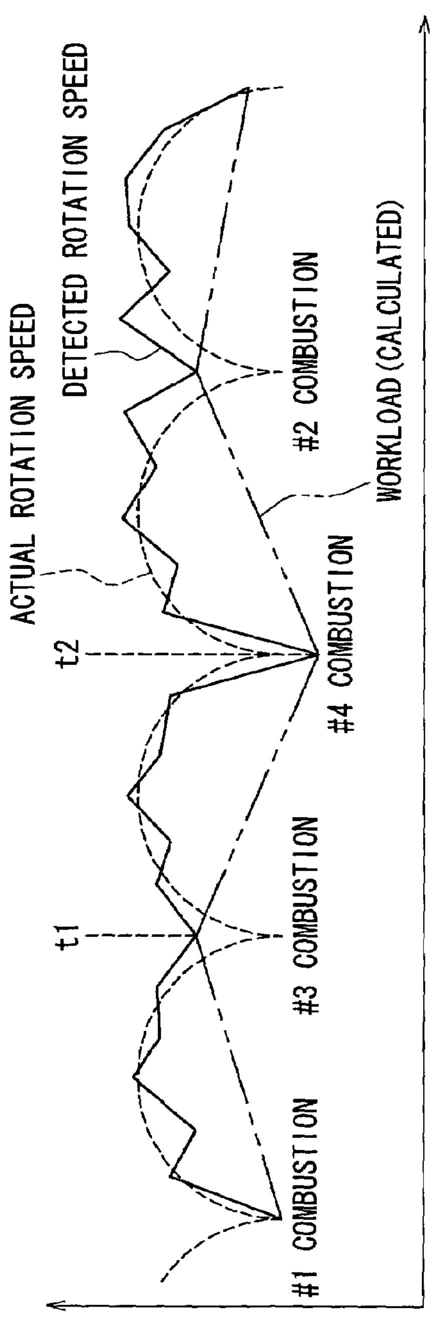

The workload of the subject cylinder can be calculated based on the rotation speed at the time when the combustion period of the cylinder is terminated. As shown in FIG. 2B, the workload of the first cylinder is calculated at a time of t1 in which the combustion period terminates. The workload of the third cylinder is calculated at a time of t2. However, the detected signals (NE pulse), which are detected by the crank angle sensor 22 and are indicative of the rotation speed, include noise and detection errors. Hence, the detected rotation speed indicated by a solid line deviates from the actual rotation speed indicated by a dashed line. The accurate workload cannot be calculated at the time of t1 and t2.

Figure 3:
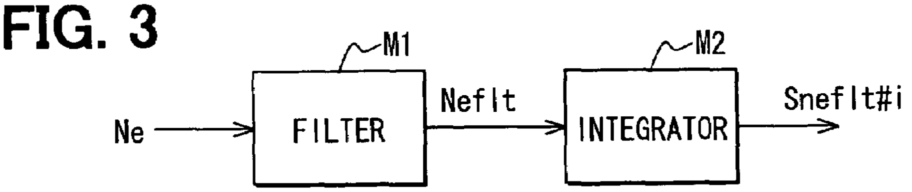
FIG. 3 is a block chart showing a control block for calculating a workload of each cylinder.

In this embodiment, as shown in FIG. 3, the rotation speed Ne is inputted into a filer M1 to calculate a value corresponding to a current torque. This value corresponding to current torque is referred to as a current torque correspondent Neflt hereinafter. The filter M1 calculates the current torque correspondent Neflt by extracting components of the rotation speed variation. The rotation speed Ne is detected in the output period of the NE pulse (30° CA). The filter M1 is comprised of a band-pass filter (BPF) to eliminate high-frequency components and low-frequency components. The current torque correspondent Neflt is expressed by a following equation (1).

$$Neflt(i)=k1\times Ne(i)+k2\times Ne(i-2)+k3\times Neflt(i-1)+k4\times Neflt(i-2) \quad (1)$$

wherein Ne(i) represents a present sampling value of the rotation speed, Ne(i−2) represent a sampling value of rotation speed at a time before previous time, Neflt (i−1) is a previous current torque correspondence, Neflt (i−2) is a current torque correspondence at a time before previous time, and k1 to k4 are constants. Every when the rotation speed Ne is inputted into the filter M1, the current torque correspondence Neflt (i) is calculated.

The above equation (1) is a discrete equation of a transfer function G(s) expressed by the following equation (2).

$$G(s) = \frac{2\zeta\omega s}{s^2 + 2\zeta\omega s + \omega^2} \quad (2)$$

wherein ζ represents an attenuation coefficient, and ω is a response frequency.

In this embodiment, the response frequency ω is defined by a combustion frequency of the diesel engine, and the constants k1-k4 are determined based on the response frequency ω. The combustion frequency is an angle frequency indicative of the number of combustion every unit angle. In a case of a four-cylinder engine, the combustion period (combustion angle period) is 180° CA, and the combustion frequency is an inverse of the combustion period.

An integrating unit M2 shown in FIG. 3 integrates the current torque correspondent Neflt in a constant range every combustion period of each cylinder in order to obtain cylinder workloads Sneflt #1-Sneflt #4 respectively. In this moment, the NE pulses outputted every 30° CA are numbered with NE pulse numbers 0-23. The NE pulse numbers 0-5 are given to the combustion period of the first cylinder, the NE pulse numbers 6-11 are given to the combustion period of the third cylinder, the NE pulse numbers 12-17 are given to the fourth cylinder, and the NE pulse numbers 18-23 are given to the second cylinder. The cylinder workloads Sneflt #1-Sneflt #4 of the first to the fourth cylinder are respectively calculated based on the following equation (3).

$$\begin{cases} Sneflt\ \#1 = Neflt(0) + Neflt(1) + Neflt(2) + Neflt(3) + Neflt(4) + Neflt(5) \\ Sneflt\ \#3 = Neflt(6) + Neflt(7) + Neflt(8) + Neflt(9) + Neflt(10) + Neflt(11) \\ Sneflt\ \#4 = Neflt(12) + Neflt(13) + Neflt(14) + Neflt(15) + Neflt(16) + Neflt(17) \\ Sneflt\ \#2 = Neflt(18) + Neflt(19) + Neflt(20) + Neflt(21) + Neflt(22) + Neflt(23) \end{cases} \quad (3)$$

The number of the cylinder will be expressed by #i, and the cylinder workloads Sneflt #1-Sneflt #4 are expressed by Sneflt #i, hereinafter.

Figure 4:
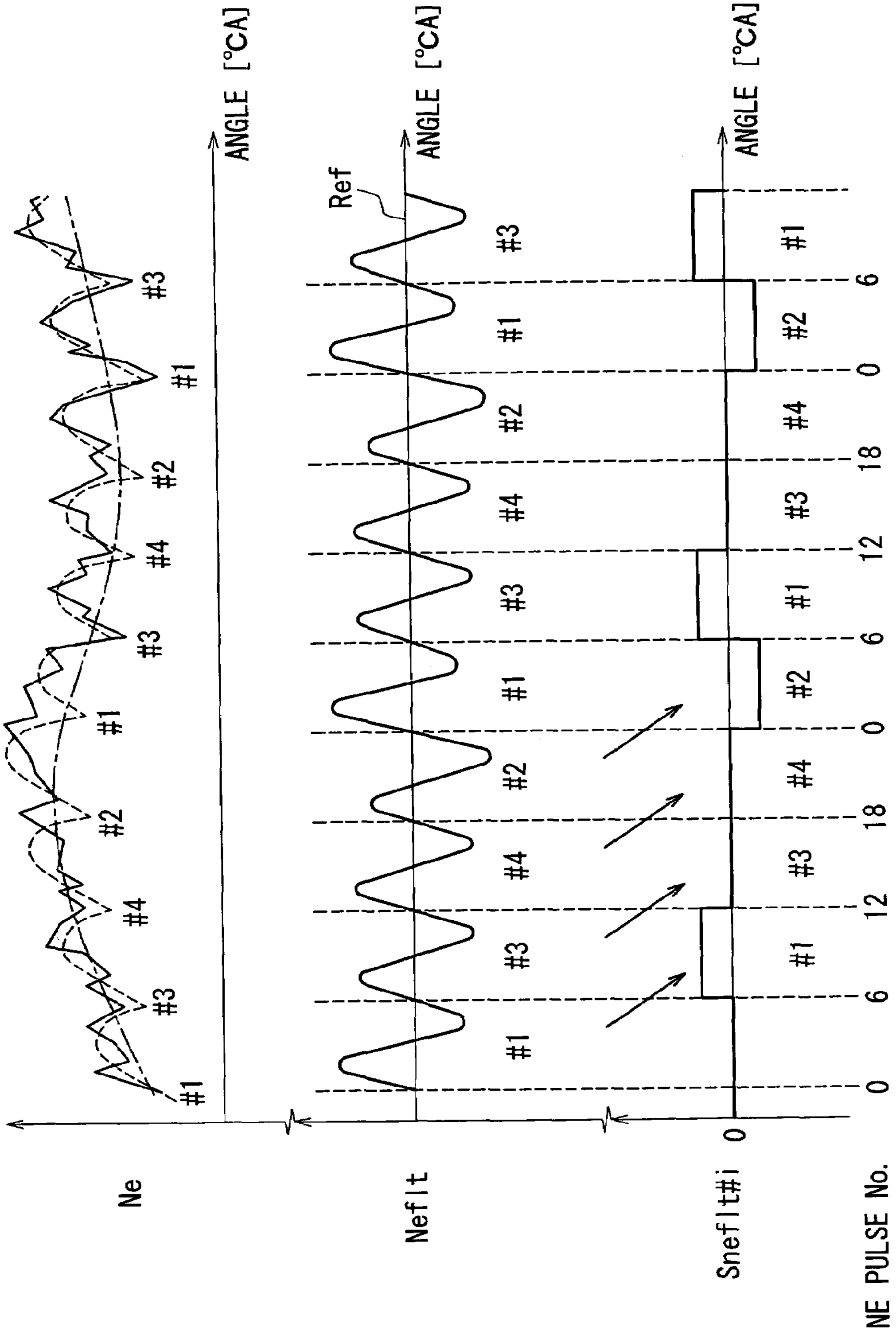
FIG. 4 is a time chart showing a rotation speed, a value corresponding to a current torque, and a workload of each cylinder.

FIG. 4 is a time chart showing the rotation speed Ne, the current torque correspondent Neflt, and the cylinder workloads Sneflt #i. The current torque correspondent Neflt periodically increases and decrease with respect to a reference revel Ref. The cylinder workload Sneflt #i is obtained by integrating the current torque correspondent Neflt in the combustion period of each cylinder. The integrated value of the positive current torque correspondent Neflt corresponds to the combustion torque, and the integrated value of the negative current torque correspondent Neflt corresponds to the load torque. The reference level Ref is determined based on the average rotation speed between cylinders.

Theoretically, the combustion torque and the load torque are equal to each other, so that the cylinder workload Sneflt #i becomes zero in the combustion period of each cylinder ("combustion torque"−"load torque"=0). However, practically, an injection characteristic and a friction characteristic of the injector 16 deteriorate with age between cylinders. Hence, the cylinder workload Sneflt #i has some variation. For example, in the first cylinder #1, the cylinder workload Sneflt #1 is larger than zero, and in the second cylinder #2, the cylinder workload Sneflt #2 is less than zero.

The cylinder workload Sneflt #i shows differences of workloads between cylinders with respect to the theoretical value and disperse of workload.

Figure 5:
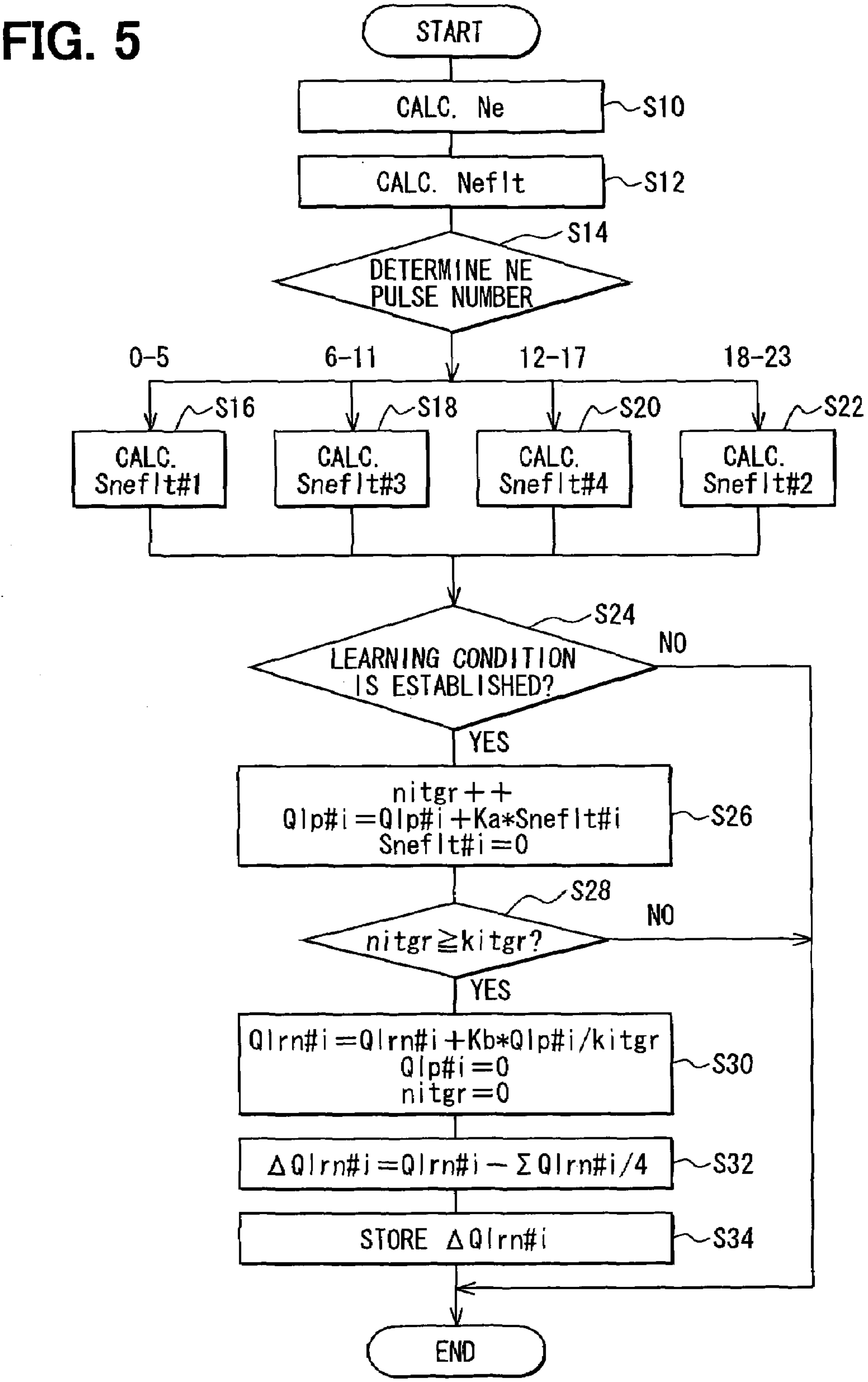
FIG. 5 is a flow chart showing a calculating process of a learning value of each cylinder.

In the present embodiment, deviation amounts of the fuel injection characteristic among each fuel injection valve 16 are learned as the deviation amounts of the cylinder workload Sneflt #i. FIG. 5 is a flowchart showing a process to calculate the deviation amounts. This process is executed by ECU 30 every when the NE pulse rises.

In step S10, a time interval of NE pulse is calculated based on the present NE pulse timing and the previous NE pulse timing in order to calculate a present rotation speed Ne (current rotation speed). In step S12, the current torque correspondent Neflt(i) is calculated based on the above equation (1).

In step S14, the present NE pulse number is determined. In steps S16-S22, the cylinder workload Snflt #i is calculated with respect to each cylinder #1-#4 according to the above equation (3). That is, when the NE pulse number is 0-5, the cylinder workload Sneflt #1 of the first cylinder #1 is calculated in step 16. When the NE pulse number is 6-11, the cylinder workload Sneflt #3 of the third cylinder #3 is calculated in step S18. When the NE pulse number is 12-17, the cylinder workload Sneflt #4 of the fourth cylinder #4 is calculated in step S20. When the NE pulse number is 18-23, the cylinder workload Sneflt #2 of the second cylinder #2 is calculated in step S22.

In step S24, it is determined whether a learning condition of the cylinder workload is established. The learning condition is satisfied when the cylinder workloads of all cylinders have been calculated, a power transmission apparatus of a vehicle has been in a predetermined condition (a clutch is completely engaged), and an environmental condition has been predetermined situation (temperature of the engine coolant is higher than a predetermined temperature).

When the answer is NO in step S24, the procedure ends. When the answer is YES in step S24, the procedure proceeds to step S26. In step S26, the number of integration times nitgr is incremented by 1, and a workload learning value Qlp #i is calculated based on a following equation (4). The cylinder workload Sneflt #i is made zero.

$$Qlp\#i=Qlp\#i+Ka\times Sneflt\#i \quad (4)$$

In step S28, it is determined whether the number of integration times nitgr has reached a predetermined number of times kitgr. When the number nitgr is lager than or equal to the number kitgr, the procedure proceeds to step S30. In step S30, the injection characteristic value Qlrn #i of each cylinder is calculated based on the following equation (5). The integrated value Qlp #i is made zero, and the number of integration times nitgr is made zero.

$$Qlrn\#i=Qlrn\#i+Kb\times Qlp\#i/kitgr \quad (5)$$

The integrated value Qlp #i is averaged every integrating times to update the injection characteristic value Qlrn #i. By averaging the integrated value Qlp #i, the error of every cylinder workload Sneflt #i can be canceled. In the equation (5), $0<Kb\leqq 1$.

In step S32, a learn value ΔQlrn #i is calculated based on the following equation (6).

$$\Delta Qlrn\ \#i = Qlrn\ \#i - \frac{1}{4}\sum Qlrn\ \#i \quad (6)$$

According to the equation (6), a dispersion of the injection characteristic value Qlrn #i is calculated with respect to the average (Σ Qlrn #i/4) of the injection characteristic value Qlrn #i.

In step S34, the learn value ΔQlrn #i is stored in a memory device. The memory device includes a nonvolatile memory, such as an EEPROM, or a backup memory.

Figure 6:
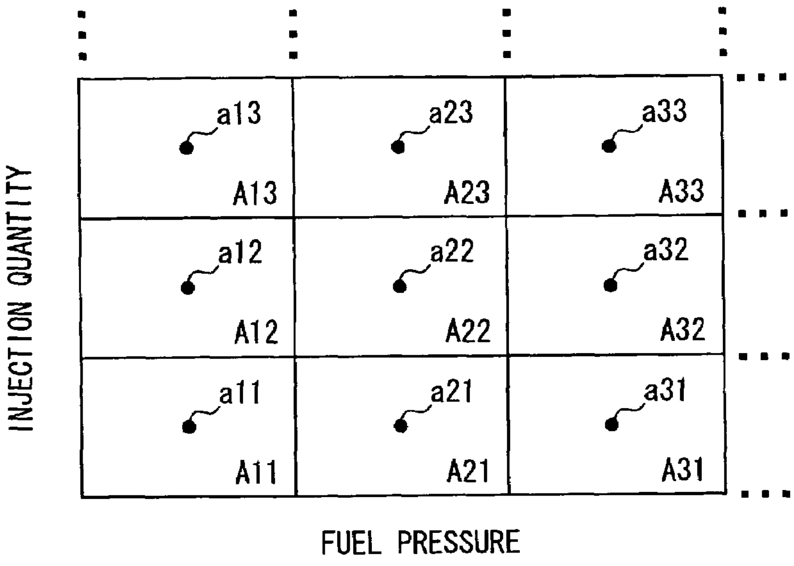
FIG. 6 is a chart showing a method for storing a learn value.

As shown in FIG. 6, the memory device has a plurality of memory regions in which the data are stored. These memory regions are divided according to the fuel pressure in the common rail 12 and the fuel injection quantity. FIG. 6 shows nine regions A11-A33 which are defined based on the fuel pressure and the fuel injection quantity. The learn value ΔQlrn #i is stored in one of the regions.

Since the learn value ΔQlrn #i varies according to the fuel injection quantity and the fuel pressure, each learn value ΔQlrn #i is stored in the respective region. By learning the learn value ΔQlrn #i with respect to each region, the fuel injection valve 16 can be operated based on the learn value ΔQlrn #i which is appropriate to the fuel injection quantity and the fuel pressure.

The operation of the fuel injection valve 16 is performed based on the learn value ΔQlrn #i. In order to use the learn value ΔQlrn #i appropriately, a representative point a1 is defined in each region Aij (i=1, 2, 3, . . . , j=1, 2, 3, . . . ) as shown in FIG. 6. The learn value ΔQlrn #i is used as a value in the representative point aij. That is, at the time of fuel injection control, when the fuel pressure and the fuel injection quantity are expressed by the representative point all, the operation of the fuel injection valve 16 is performed by use of the learn value ΔQlrn #i at the representative point all. The representative point aij is set as the most appropriate value which makes the learn value ΔQlrn #i as a true value.

Figure 7:
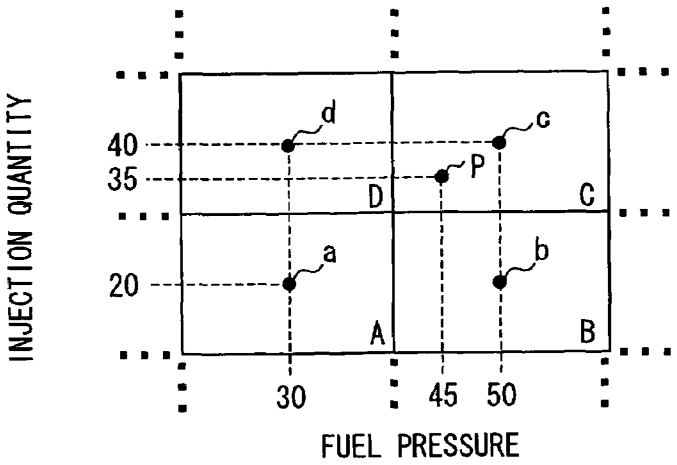
FIG. 7 is a chart for explaining an interpolating process by use of the learn value.

When the fuel pressure and the fuel injection quantity meet no representative point, the learn value ΔQlrn #i is calculated by interpolating process to meet the current fuel pressure and the current fuel injection quantity. Referring to FIG. 7, the interpolating process will be described hereinafter.

In FIG. 7, adjacent four regions Aij are expressed by regions A-D and the representative point are expressed by points a-d. In the representative points a-d, the fuel pressure and the fuel injection quantity are respectively (30, 20), (50, 20,) (50, 40), and (30, 40). In the region D, the point p represents that the fuel pressure is "45" and the fuel injection quantity is "35". The point P is not in consistent with the representative point c. When the current fuel injection amount and the current fuel pressure are expressed by the point P, the interpolating process is conducted by use of the learn value ΔQlrn #i at the representative points a-d. In this embodiment, the learn value ΔQlrn #i at the representative points a-d are respectively defined as "2", "4", "6", and "4".

The learn value ΔQlrn #i at a projected point of the point P which is projected on a line connecting the representative point a and the representative point b is calculated by use of the interpolating process as follows.

$$(45-30)\div(50-30)\times(4-2)+2=3.5$$

The learn value ΔQlrn #i at a projected point of the point P which is projected on a line connecting the representative point c and the representative point d is calculated by use of the interpolating process as follows.

$$(45-30)\div(50-30)\times(6-4)+4=5.5$$

The learn value ΔQlrn #i at the point P is calculated by use of the interpolating process as follows.

$$(35-20)\div(40-20)\times(5.5-3.5)+3.5=5$$

In a case that the learn value ΔQlrn #i at the representative point is not calculated according to the process shown in FIG. 5, the learn value ΔQlrn #i, which is obtained by the interpolating process based on the representative point, may not be appropriate value. Even if the learn value ΔQlrn #i is learned, only one learning is insufficient. The learning must be repeated so that the learn value ΔQlrn #i converges to an appropriate value. Especially in a case that the value of coefficient Kb is smaller than 1, the learning must be repeated many times. The appropriate learn value ΔQlrn #i is hardly obtained by the interpolating process based on the representative points of which learn value ΔQlrn #i has not converged yet.

Figure 8A:
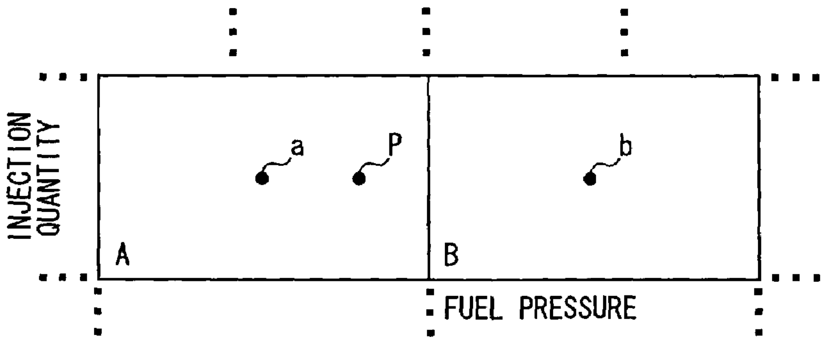
FIGS. 8A to 8C are charts for explaining problems in the interpolating process.
Figure 8B:
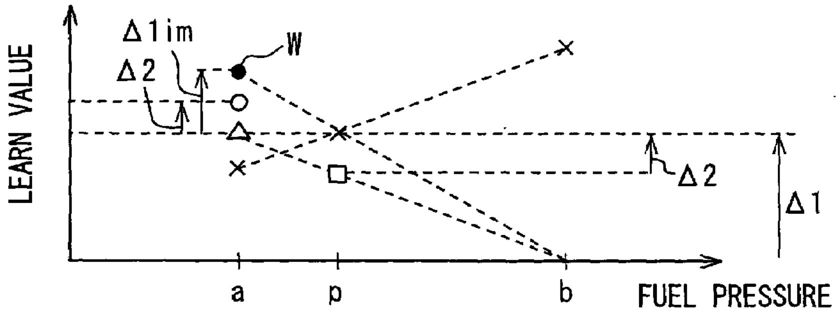
Figure 8C:
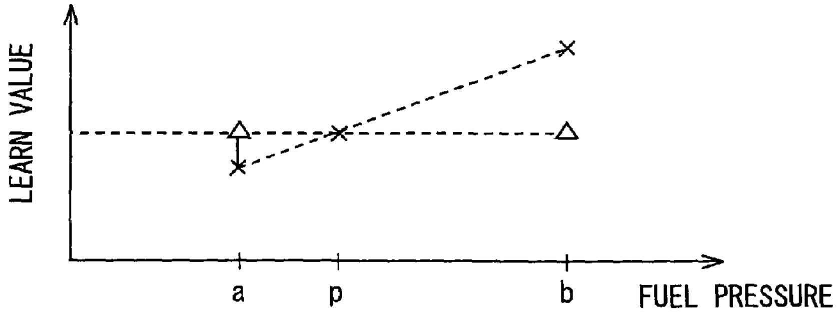

In a case that the learn value ΔQlrn #i obtained by the interpolating process is not appropriate value, a calculation accuracy of the process shown in FIG. 5 may be deteriorated. Referring to FIGS. 8A, 8B, and 8C, it is described in detail hereinafter.

In FIG. 8A, the point P is on a line connecting the representative point a of the region A and the representative point b of the region B, and in within the region A. The true learn values ΔQlrn #i at the representative points a, b and P are denoted by "X" in FIG. 8B.

In a case that the learn value ΔQlrn #i is not learned at the representative points a and b, the learn value ΔQlrn #i at the point P calculated by the interpolating process is zero. While the point P is maintained over 720×n° CA to conduct learning process shown in FIG. 5, the learn value ΔQlrn #i becomes the true learn value at the point P. (Here, the coefficient Kb is set to 1.) Thereby, the learn value ΔQlrn #i is increased by Δ1 and is denoted by a triangular shape in FIG. 8B. The learn value ΔQlrn #i at the point P is denoted by a square, which is obtained by the interpolating process. This learn value ΔQlrn #i denoted by the square is smaller than the true learn value by Δ2. When the fuel injection control is conducted based on the value denoted by the square in FIG. 8B for a predetermined time period, the learn value ΔQlrn #i in the region A is learned as "Δ1+Δ2". Thereby, after second learning process, the learn value ΔQlrn #i at the representative point a is denoted by a circle in FIG. 8B.

By interpolating process by use of the representative point b in a case where the learn value has not been learned yet at the representative point b, the learn value ΔQlrn #i at the representative point a is learned as the value which is larger than the true value. While the learning process is not conducted at the representative point b, the learn value at the representative point a has bee erroneously learned toward a point W which is on a line connecting the point b and the true value at the point P.

According to the present embodiment, in a case that the learn value ΔQlrn #i has not converged at the representative point which is used for interpolating process and is not in the region in which the current fuel injection quantity and the current fuel pressure exist, the learn value ΔQlrn #i in the region where the current fuel injection quantity and the fuel pressure exist is used as the learn value ΔQlrn #i that has not converged yet.

For instance, in a case that the learn value ΔQlrn #i has not been learned yet at the representative points a and b, when the answer is Yes in step S28 in FIG. 5, the learn value ΔQlrn #i at the representative point a is updated by an updating amount in step S32. Thereby, as shown in FIG. 8C, the learn value ΔQlrn #i at the representative point a becomes true learn value at the point P. Then, from the subsequent processes, when the fuel injection quantity and the fuel pressure are represented by the point P, the learn value ΔQlrn #i at the representative point a is used as the learn value ΔQlrn #i at the representative point b. By the interpolating process, the value at the point P is calculated as the true value. Since the fuel injection control is conducted based on the true value at the point P, the learn value ΔQlrn #i at the representative point a is not erroneously learned.

Figure 9:
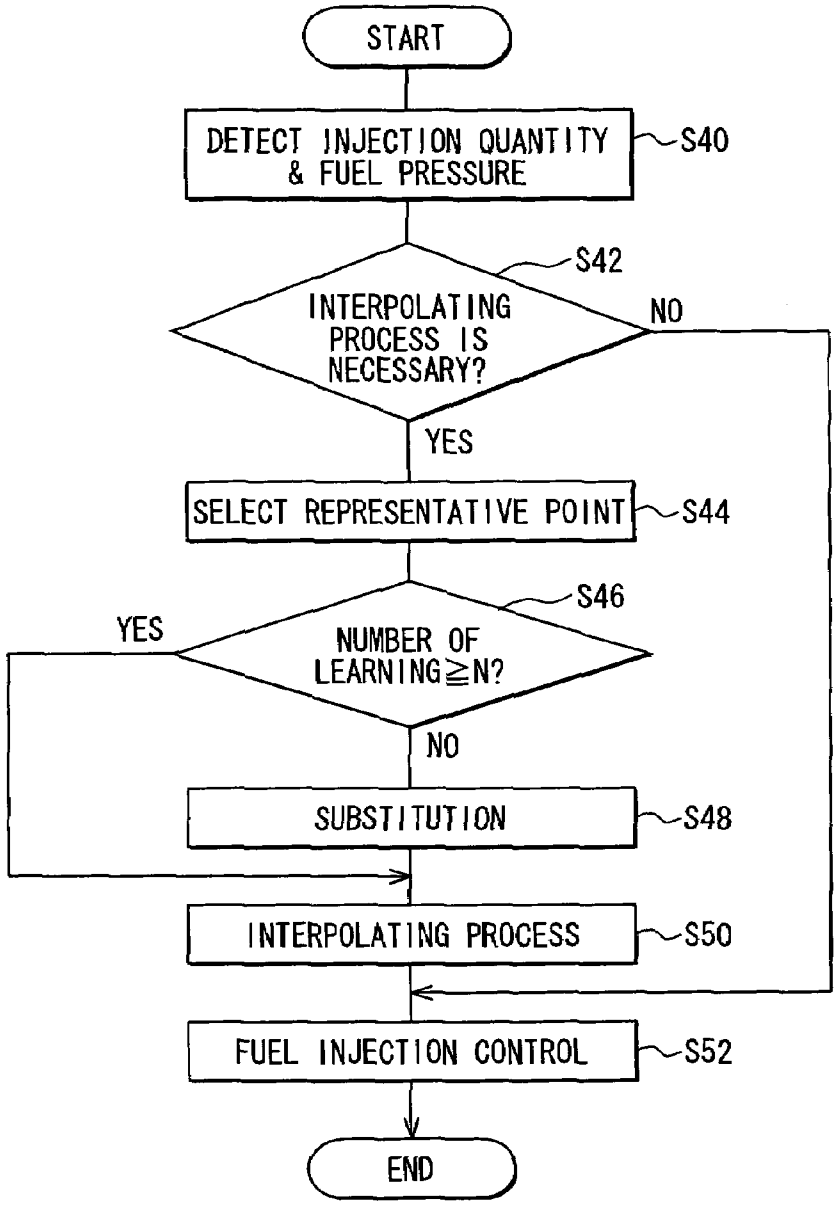
FIG. 9 is a flowchart showing processes of a fuel injection control.

FIG. 9 is a flowchart showing the fuel injection control. In step S40, the fuel pressure sensor 20 detects the current fuel pressure and the current fuel injection quantity. In step S42, the computer determines whether the interpolating process is necessary. In other words, the computer determines whether the current values are in consistent with the representative point.

When the answer is Yes in step S42, the procedure proceeds to step S44 in which the representative point is selected, which is used for interpolating process. For instance, when the point defined by the current fuel pressure and the fuel injection quantity is the point P, the representative points a-d are selected.

In step S46, the computer determines whether the number of learning in the region where the true value does not exist excesses a predetermined number N. This number N is for determining whether the learn value ΔQlrn #i has converged.

When the answer is No in step S46, the procedure proceeds to step S48 in which the learn value ΔQlrn #i in a region where the number of learning is less that the predetermined number N is replaced by the learn value ΔQlrn #i in the region where the current fuel pressure and the current fuel injection quantity exist.

When the answer is Yes in step S46 and when the process in step S48 is completed, the process proceeds to step S50 in which the learn value ΔQlrn #i of the current fuel pressure and fuel injection quantity is calculated by use of the learn value at the representative point selected in step S44. In a case that the answer is No in step S46, the replaced value, which is obtained in step S48, is included in the selected representative points.

In step S52, the fuel injection valve 16 is operated based on a command value from which the learn value is subtracted. In a case that the answer is No in step S42, the fuel injection valve 16 is operated by use of the learn value ΔQlrn #i at the representative point which is consistent with the current value. In a case that the interpolating process is conducted in step S50, the fuel injection valve 16 is operated based on a command value from which a value calculated by the interpolating process is subtracted.

As described above, even when the learn value ΔQlrn #i includes the representative point which has not converged yet, the fuel injection control is appropriately conducted by use of the interpolating process.

For instance, in FIG. 7, in a case that the learn value ΔQlrn #i at the representative point b converges to "4" and the learn values ΔQlrn #i at the representative points a, c, and d are zero, the learn value ΔQlrn #i at the point P is calculated as "0.75" by the interpolating process. Since the true value at the point P is "5", the learn value ΔQlrn #i at the representative point c is updated to "4.25" according to the process shown in FIG. 5.

At the subsequent fuel injection control, according to the process shown in FIG. 9, the value of "4.25" is substituted for the learn value ΔQlrn #i at the representative points a and d. Thereby, the learn value at the point P is calculated as "4.140625" by the interpolating process. The fuel injection control is conducted by use of this value, whereby the learn value ΔQlrn #i at the representative point c is updated to "5.109375". After the subsequent fuel injection control, the value of "5.109375" is substituted for the learn values ΔQlrn #i at the representative points a and d.

By repeating the above process, the substitute value for the learn value ΔQlrn #i at the representative points a, c, and d converges to "5.23077" so that the learn value ΔQlrn #i at the point P finally becomes "5".

According to the preset embodiment, following advantages are obtained.

(1) In a case that the learn value ΔQlrn #i has not converged yet at the representative point in the region where the true values do not exists, this learn value ΔQlrn #i is substituted for the learn value ΔQlrn #i in the region where the true value exists. Thereby, the deviation value which is calculated by the interpolating process can be made more appropriate.

(2) In a case that the number of learning of the learn value ΔQlrn #i at the representative point exceeds the predetermined number N, it is determined that the learn value ΔQlrn #i has converged. Thereby, it is easily and appropriately determined that the learn value ΔQlrn #i has converged.

(3) The filter M1 calculates the current torque correspondent. Based on this correspondent, the fuel injection characteristic of the fuel injection valve 16 is estimated. Thereby, the fuel injection characteristic is appropriately estimated.

(4) The reference point of the learn value ΔQlrn #i is set to an average fuel injection characteristic among cylinders, whereby the rotation speed can be uniformed.

(5) The region where the learn value ΔQlrn #i is learned is defined based on the fuel pressure in the common rail 12 and the command value of the fuel injection quantity. Thereby, appropriate deviation amounts can be learned in every region.

Other Embodiment

The region where the learn value ΔQlrn #i is learned can be defined based on at least one of the rotation speed of the crankshaft 8, the fuel pressure and the fuel injection command value.

The reference fuel injection characteristic can be an average fuel injection characteristic which is a center characteristic of the fuel injection valve 16.

A correction value of the fuel injection period can be stored as the deviation amount.

The current torque correspondent Neflt is integrated in a specific range in which the rotation speed increases or in a specific range in which the rotation speed decreases in order to obtain the workload. The deviation amount relative to the reference value can be calculated based on the above workload. Alternatively, the deviation amount can be calculated based on the current torque correspondent Neflt. The deviation amount can be calculated based on other than the current torque correspondent.

The interpolating process can be conducted by use of a quadratic curve.

The internal combustion engine includes a direct-injection engine.

What is claimed is:

1. A fuel injection controller comprising:

a learning means for learning and storing a deviation amount relative to a reference of an operational characteristic of an actuator, which is used for a fuel injection control for an internal combustion engine, as a deviation amount at a representative point with respect to each region which has been plurally divided with parameters used for the fuel injection control;

an operating means for operating the actuator in such a manner as to compensate the deviation amount which is obtained by an interpolating process by use of the stored deviation amount in a case that actual value of parameters are consistent with no representative point;

a determining means for determining whether the deviation amount converges at the representative point which is used for the interpolating process and is in a region where the actual value of parameters does not exist; and a substituting means for substituting the deviation amount at the representative point in a region in which the actual value of parameters exists for the deviation amount which has not converged in a case that the determining means determines that the deviation amount has not converged.

2. A fuel injection controller according to claim 1, wherein the determining means determines that the deviation amount has converged when a frequency of learning of the deviation amount at the representative point exceeds a predetermined number.

3. A fuel injection controller according to claim 1, wherein the actuator includes a fuel injection valve, and the learning means includes a filtering means for filtering the rotation speed by a frequency which is defined based on a combustion frequency of the internal combustion engine in order to obtain a value corresponding to a current torque, and an estimating means for estimating a characteristic of each fuel injection valve based on the value corresponding to the current torque.

4. A fuel injection controller according to claim 3, wherein the internal combustion engine includes a multi-cylinder engine, and a reference of an operational characteristic of the fuel injection valve is established as an average fuel injection characteristic among each cylinder.

5. A fuel injection controller according to claim 3, wherein the parameters are comprised of a fuel pressure supplied to the fuel injection valve and a command value indicative of a fuel injection quantity to the fuel injection valve.

* * * * *